US006838810B1

(12) United States Patent
Bovio et al.

(10) Patent No.: US 6,838,810 B1
(45) Date of Patent: Jan. 4, 2005

(54) FLAT-PANEL DISPLAY MOUNTING SYSTEM FOR PORTABLE COMPUTER

(75) Inventors: Michele Bovio, Boston, MA (US); Robert C. Frame, Westboro, MA (US)

(73) Assignee: Chunghwa Picture Tubes, Ltd., Padeh (TW)

(*) Notice: Subject to any disclaimer, the term of this patent is extended or adjusted under 35 U.S.C. 154(b) by 0 days.

(21) Appl. No.: 08/822,438

(22) Filed: Mar. 21, 1997

(51) Int. Cl.[7] .............................. G06F 1/16; H01J 19/42

(52) U.S. Cl. ...................... 313/422; 361/681; 361/683; 313/238

(58) Field of Search .............................. 313/422, 238, 313/292; 361/681–683; 359/58; 348/835; 349/58

(56) References Cited

U.S. PATENT DOCUMENTS

| | | | |
|---|---|---|---|
| 4,111,533 A | 9/1978 | Nakamura et al. | |
| 4,165,607 A | 8/1979 | Fedorowicz et al. | |
| 4,422,728 A | 12/1983 | Andreaggi | |
| 4,755,035 A | 7/1988 | Kopish et al. | |
| 4,781,422 A | 11/1988 | Kimble | |
| 4,796,977 A | 1/1989 | Drake | 350/331 R |
| 4,937,709 A | 6/1990 | Yanagi et al. | |
| 4,959,887 A | 10/1990 | Gruenberg et al. | |
| 5,002,368 A | 3/1991 | Anglin | 350/334 |
| 5,102,084 A | 4/1992 | Park | |
| 5,103,377 A | 4/1992 | Kobayashi et al. | |
| 5,168,426 A | 12/1992 | Hoving et al. | |
| 5,173,837 A | 12/1992 | Blackwell et al. | |
| 5,195,213 A | 3/1993 | Ohgami et al. | |
| 5,216,411 A | 6/1993 | Ashitomi et al. | |

(List continued on next page.)

FOREIGN PATENT DOCUMENTS

| | | |
|---|---|---|
| DE | 41 20 950 | 12/1992 |
| EP | 0 317 261 | 5/1989 |
| EP | 0 425 793 | 9/1991 |
| EP | 0 454 120 | 10/1991 |
| EP | 0 532 284 | 3/1993 |
| EP | 0 604 872 | 7/1994 |
| GB | 2 305 689 | 4/1997 |
| GB | 2 305 690 | 4/1997 |
| JP | 59-020273 | 2/1984 |
| JP | 62-137479 | 8/1987 |
| JP | 62-269931 | 11/1987 |
| JP | 01-59223 | 4/1989 |
| JP | 01-094983 | 4/1989 |

(List continued on next page.)

OTHER PUBLICATIONS

IBM Technical Disclosure Bulletin, vol. 39, No. 01. § 71–73 "Structure Design for Liquid Crystal Display Module," Jan. 1996.

(List continued on next page.)

Primary Examiner—Ashok Patel
(74) Attorney, Agent, or Firm—TraskBritt

(57) ABSTRACT

A flat-panel display with fixtures in its sidewalls to enable support by lateral mounting members is disclosed. The advantage of this approach, in which the fixtures are essentially rotated around to the sides of the flat-panel display, is the reduction in the portion of the portable computer's top cover that is not the active display. In practice, this results in an increase in the size of the display that may be housed in the same-sized top cover. In order to accommodate the lateral mounting of the flat-panel display, metal brackets are used. These brackets extend from the base unit hinges and cradle the display. This adds torsional rigidity, but also removes the requirement that the back must be structural. Further reductions in the inactive portions of the top cover may be achieved by extending the ends of the display's fluorescent back-light beyond or through the metal rim that surrounds the display.

7 Claims, 3 Drawing Sheets

U.S. PATENT DOCUMENTS

| | | | |
|---|---|---|---|
| 5,233,502 A | 8/1993 | Beatty et al. | |
| 5,238,421 A | 8/1993 | Kobayashi | |
| 5,264,992 A | 11/1993 | Hogdahl et al. | |
| 5,268,817 A | 12/1993 | Miyagawa et al. | 361/729 |
| 5,276,589 A | 1/1994 | Bartlett et al. | |
| 5,313,318 A | 5/1994 | Gruenberg et al. | 359/49 |
| 5,328,379 A | 7/1994 | Kobayashi | |
| 5,363,227 A | 11/1994 | Ichikawa et al. | 359/83 |
| 5,422,751 A | 6/1995 | Lewis et al. | 359/83 |
| 5,432,626 A | 7/1995 | Sasuga et al. | |
| 5,467,106 A | 11/1995 | Salomon | |
| 5,467,504 A | 11/1995 | Yang | |
| 5,479,285 A | 12/1995 | Burke | |
| 5,486,942 A | 1/1996 | Ichikawa et al. | 359/83 |
| 5,494,447 A | 2/1996 | Zaidan | |
| 5,504,605 A | 4/1996 | Sakuma et al. | |
| 5,559,670 A | 9/1996 | Flint et al. | |
| 5,566,048 A | 10/1996 | Esterberg et al. | |
| 5,568,357 A | 10/1996 | Kochis et al. | |
| 5,570,267 A * | 10/1996 | Ma | 361/681 |
| 5,619,351 A | 4/1997 | Funamoto et al. | |
| 5,634,351 A | 6/1997 | Larson et al. | |
| 5,636,101 A | 6/1997 | Bonsall et al. | |
| 5,636,102 A | 6/1997 | Fujino et al. | |
| 5,644,516 A * | 7/1997 | Podwalny et al. | 361/681 |
| 5,654,779 A | 8/1997 | Nakayama et al. | |
| 5,666,172 A | 9/1997 | Ida et al. | |
| 5,680,183 A | 10/1997 | Sasuga et al. | |
| 5,682,645 A | 11/1997 | Watabe et al. | |
| 5,717,566 A * | 2/1998 | Tao | 361/681 |
| 5,771,539 A | 6/1998 | Wahlstedt et al. | |
| 5,777,704 A | 7/1998 | Selker | |
| 5,815,225 A * | 9/1998 | Nelson | 349/65 |
| 5,835,139 A | 11/1998 | Yun et al. | |
| 5,905,550 A * | 5/1999 | Ohgami et al. | 349/58 |
| 5,926,237 A | 7/1999 | Yun et al. | |
| 6,002,457 A | 12/1999 | Yun et al. | |
| 6,020,942 A | 2/2000 | Yun et al. | |
| 6,373,537 B2 | 4/2002 | Yun et al. | |

FOREIGN PATENT DOCUMENTS

| | | |
|---|---|---|
| JP | 01-211721 | 8/1989 |
| JP | 01-237591 | 9/1989 |
| JP | 02-79893 | 3/1990 |
| JP | 02-083573 | 6/1990 |
| JP | 02-244190 | 9/1990 |
| JP | 03-006670 | 1/1991 |
| JP | 03-156488 | 7/1991 |
| JP | 04-020086 | 2/1992 |
| JP | 04-051595 | 2/1992 |
| JP | 05-50428 | 2/1993 |
| JP | 05-080334 | 4/1993 |
| JP | 06-021018 | 3/1994 |
| JP | 3001011 | 6/1994 |
| JP | 06-348364 | 12/1994 |
| JP | 07-099394 | 4/1995 |
| JP | 07-199180 | 8/1995 |
| JP | 07-261187 | 10/1995 |
| JP | 07-281184 | 10/1995 |
| JP | 07-044577 | 11/1995 |
| JP | 07-044579 | 11/1995 |
| JP | 08-211964 | 8/1996 |
| JP | 52-045367 | 4/1997 |
| JP | 09-146466 | 6/1997 |
| JP | 09-199875 | 7/1997 |
| JP | 09-297542 | 11/1997 |
| JP | 10-301095 | 11/1998 |

OTHER PUBLICATIONS

IBM Technical Disclosure Bulletin, vol. 33, No. 9 § 261–262 "High Efficiency Back Light for LCD," Feb. 1991.

IBM Technical Disclosure Bulletin, vol. 37, No. 12 "Cell Support Assembly without Screw," Dec. 1994.

Advanced Display Inc. "14.2 XGA (Ver.2) Technical Data, AA142XB11," Feb. 1997.

Kawamoto et al., "Color—Liquid–Crystal Display for Automotive Instrument Panel," Toshiba Review, Dec. 1984, 1071–1074.

"Nikkei Microdevice Special Issue Flat Panel Display 1997" (Dec. 20, 1996) p. 49, Nikkei BP.

Declaration of Robert C. Frame, dated Feb. 24, 2004, pp. 1–14.

Declaration of Michele B. Bovio, dated Feb. 28, 2004, pp. 1–9.

* cited by examiner

FLAT-PANEL DISPLAY MOUNTING SYSTEM FOR PORTABLE COMPUTER

BACKGROUND OF THE INVENTION

Portable computers almost universally have a top cover that pivots to open or close over a base unit. The top cover typically houses a flat-panel display, and the base unit has a keyboard and, many times, some form of pointing device.

In most cases, the flat-panel display is supported in the top cover by securing it to a plastic back or rear portion of the top cover. Usually, the flat-panel display has four or more holes around its periphery; bolts extend orthogonally to the face of the display, through the holes, to engage bosses, which are integral with the back. The plastic back is typically structural in nature, being manufactured from a rigid plastic. When connected together, the flat-panel display and the plastic back provide necessary rigidity to the top cover.

The selection of the flat-panel display in portable computers is generally driven by two competing concerns. On one hand, with the availability of ever-larger flat-panel displays, there is a desire to incorporate those displays into newer portable computer designs. Running contrary to this, however, is the desire to limit the overall dimensions of the computers to enhance their portability. For example, it is common to design portable computers with outside dimensions limited to approximately 8×11". These dimensions are characteristic of notebook-sized computers.

Various innovations have come about to increase the active or viewing area of the flat-panel display as a proportion of the total surface area of the top cover to obtain larger displays without increasing the computer's overall dimensions. For example, it is known to fold the driving and other peripheral circuitry around to the back of the flat-panel display. This results in a display panel whose surface area is almost entirely active except for the width of the metal rim that holds the display together and the bolt holes that are used to attach the flat-panel display to the plastic back.

SUMMARY OF THE INVENTION

The problem with prior art configurations is the fact that they fail to recognize that the size of the top cover need not be large enough to accommodate the bolt holes. According to the present invention, the flat-panel display is provided with fixtures in the display's sidewalls to provide for its support by lateral mounting members. The advantage of this approach, in which the bolt holes are essentially rotated around to the sides of the flat-panel display, is the reduction in the portion of the portable computer's top cover that is not an active display. In practice, this results in an increase of six millimeters or more in the size display that may be housed in the same-sized top cover.

In specific embodiments, the lateral mounting members comprise bolts that engage bosses in the flat-panel display.

Further reductions in the inactive portions of the top cover may be achieved by extending the ends of the display's fluorescent back-light beyond or through the metal rim that surrounds the display. This allows the rim to be even thinner.

Also according to the invention, in order to accommodate the lateral mounting of the flat-panel display, metal brackets are used. These brackets extend from the base unit hinges and cradle the display. This adds torsional rigidity, but also removes the requirement that the back must be structural. As a result, the back can simply be a thin, molded cosmetic rear cover for the computer's top cover.

In specific embodiments, the lateral mounting members, or bolts, pass through the brackets and the plastic back to engage the bosses, thus binding the elements to each other.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
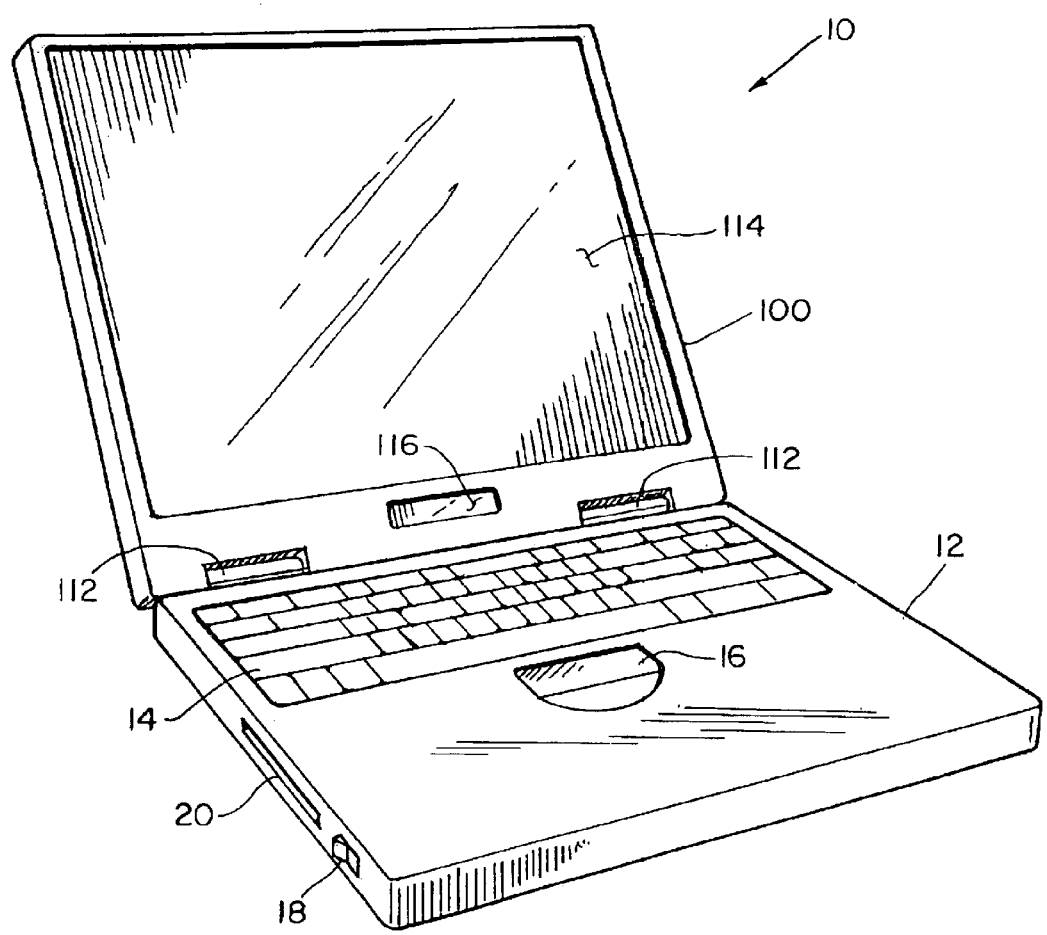
FIG. 1 is a perspective view of a portable computer according to the present invention.

FIG. 1 illustrates a personal computer 10 constructed according to the principles of the present invention. Generally, the computer 10 has a top cover 100 that is connected by hinges 112, or otherwise pivotally attached, to a base unit 12. The top cover 100 houses a flat-panel display 114 and a second, much smaller, status display 116, which typically provides information concerning remaining battery life, disk drive operation, and other house-keeping A functions. The base unit 12 has keyboard 14 and a pointing device 16, a touch pad in the illustrated embodiment. A power switch 18 and disk drive door 20 are located on the side of the base unit 12.

The overall dimensions of the particular embodiment illustrated when closed are about 8.5 inches wide by 12 inches long, which dimensions also apply to the top cover 100 and base unit 12 separately. The total closed height is over two inches, with the height of the top cover 100 being approximately 0.5 inches.

The unique characteristics of the present invention are evident in the ratio between the total surface area of the top cover 100 and the surface area of the active or viewable area of the display 114. The active area of the display illustrated is 14.1 inches, diagonally.

Consequently, it consumes over 90% of the top cover's total area.

Figure 2:
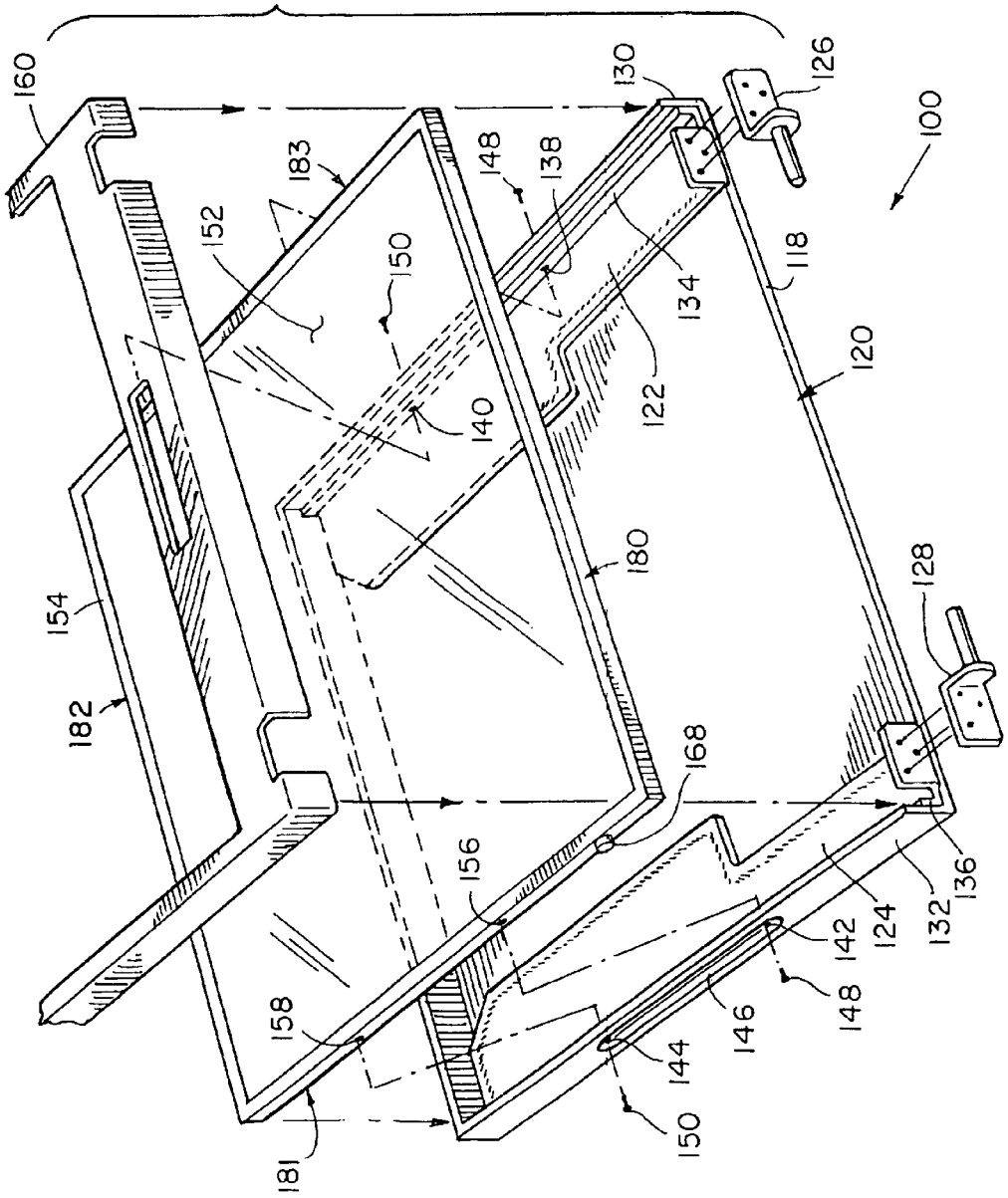
FIG. 2 is an exploded view of the top cover of the portable computer according to the invention.

FIG. 2 illustrates the mounting technique for the display 114 in the top cover 100. Structurally, the top cover 100 comprises a back 118. This component is almost universally constructed from plastic and forms the top outer shell of the portable computer 10 when the top cover 100 is closed. The back 118 is rectangular in shape and forms essentially a tub around the other elements of the top cover. The proximal wall 120 of the back is not present, however, to accommodate the hinge connection to the base unit.

In many prior art designs, the back 118 of the top cover 100 provided significant structural support to the back cover. This fact was evident by the existence of spines or ridges, which are integral with the back, that added rigidity. It is also common to bolt the display to the back by placing bosses in the back during molding. In the present embodiment, only the sidewalls of the back 118 contribute to the back's bending rigidity, and the back overall has little torsional rigidity.

Rigidity, especially torsional, is added to the top cover by right and left metal brackets 122, 124 that are located in the back. The proximal portion of each bracket 122, 124 connects to respective right and left hinge elements 126, 128 that are adapted to cooperate with corresponding hinge elements in the base unit 12. The brackets 122, 124 are each aligned against respective sidewalls 130, 132 of the back 118. The cross-section of each bracket is essentially "L"-shaped, the shorter legs 134, 136 extending orthogonally away from the planar inner surface of the back 118 and abutting the back's sidewalls 130, 132. Two holes 138, 140 in each bracket are sized to accommodate bolts 148, 150, 2 millimeters in diameter, and the holes align with corresponding holes 142, 144 through the sidewalls 130, 132 of the back 118. Preferably, the outer surfaces of the back's sidewalls 130, 132 have slight depressions 146 to recess heads of the bolts 148, 150.

The flat-panel display 114 (not shown) comprises a large active area 152 that is defined by the transparent top window of the display 114. The top window is clamped to the panel's plastic back (not shown in this figure) by a metal rim 154 that extends around the display's circumference, defining the display's bottom (180), left (181), top (182), and right (183) sidewalls. Holes 156, 158, formed in the metal rim 154, align with the holes in the brackets and back when the display is installed. The four bolts 148, 150 extend through the back 118, brackets 122, 124 to engage bosses held in the display 114 behind the metal rim 154.

A plastic bezel 160 snap fits over the display onto the back. The bezel's rim extends inward hiding the display's metal rim.

Figure 3:
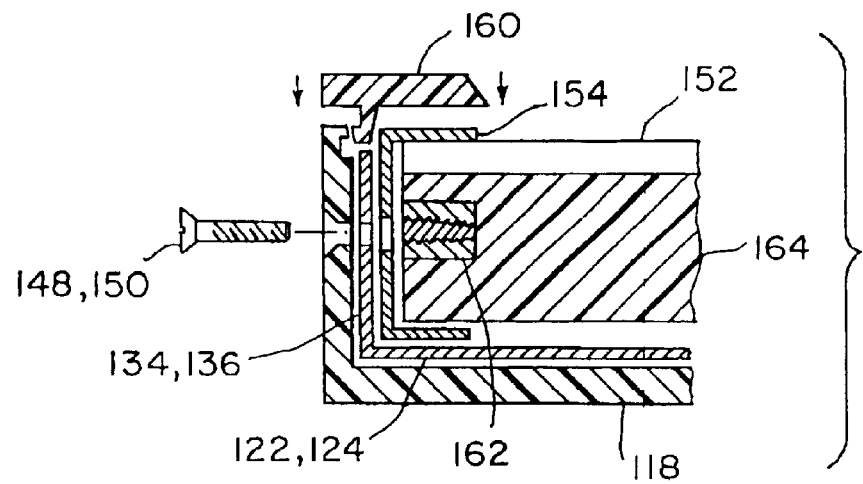
FIG. 3 is a cross-sectional view of the inventive top cover.

FIG. 3 is cross-sectional view further illustrating the back cover's construction. As discussed previously, each of the four bolts 148, 150 extends through the back 118 and corresponding vertical legs 134, 136 of the brackets 122, 124. The bolts 148, 150 further extend through the metal rim 154 of the display to engage corresponding threaded bosses 162 held in the plastic back 164 of the display. Also shown is the snap-fit arrangement of the plastic bezel 160 to the back 118.

Figure 4:
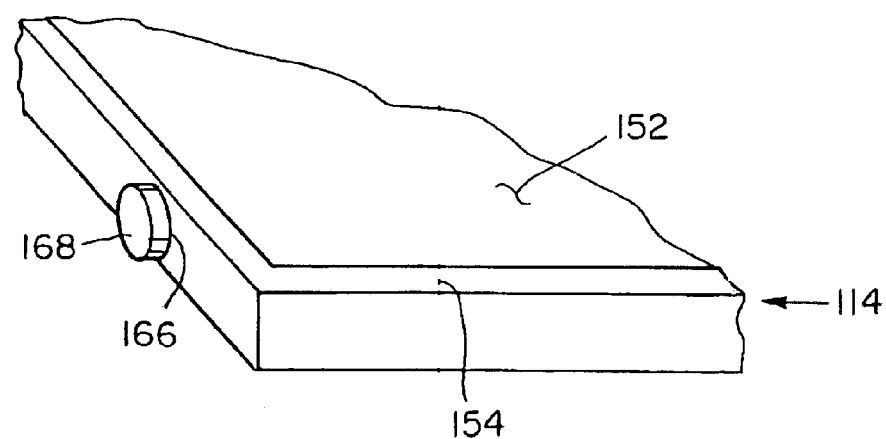
FIG. 4 is a partial perspective view of a corner of an inventive flat-panel display.

FIG. 4 is a detailed view of one of the lower outer corners of the flat-panel display 114 illustrating another innovation of the invention that enables a more compact display. Usually, the length of the fluorescent back-light plus the thickness of the display's metal rim dictate the overall width of the display. The light emitting portion of the fluorescent light must be as wide as the active area of the display, but electrodes on the end of the light are wider than the small peripheral inactive portion of the display.

According to the present invention, circular cut-outs 166 are formed in the metal rim 154 to allow the ends of the fluorescent back-light 168 to extend slightly beyond the outer surface of the rim 154. As a result, the overall width of the display is no wider than the critical length of the fluorescent back-light 168. In effect, twice the thickness of the metal rim, since cut-outs 166 are provided for both ends of the light 168, is removed from the overall width of the display without any loss in active area. Defined another way, the inactive portions on both sides of the display are each decreased by the thickness of the metal rim 154 by enabling the ends of the back-light 168 to extend beyond the rim.

In other embodiments of the invention, the bolts 148, 150 may be replaced with pins that extend through the back 118 and brackets 122,124 to engage non-threaded holes in the sidewalls 180–183 of the display 114, possibly using an interference fit. Alternatively, these pins could be integral with the metal brackets 122,124. In this later case, it may be desirable to have the display 114 to snap fit with the pins, to facilitate the manufacturing process.

In still another embodiment, pins extend outward from the display 114, possibly integral with the metal rim 154 to engage the brackets 122, 124 with an arrangement. This configuration has an advantage, because there is no need to accommodate holes in the display, which could affect the display's electrical design.

In still other embodiments, mounting could be accomplished off of the top and bottom sidewalls 180, 182 of the display 114. In this case, lateral mounting members that cooperate with these sidewalls would be used to replace the mounting fixtures on the right and left sidewalls 181, 183, or in addition to those fixtures.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. In a flat-panel display having a back, a display area, and a light, a mounting system mounting the flat-panel display in a folding top cover of a portable computer, the mounting system comprising:

a flat-panel display comprising a display panel, a display rim extending around a perimeter of the display panel, and a display back, the flat-panel display having a plurality of side walls including at least two holes formed laterally therein for mounting the flat-panel display in the top cover of a portable computer, the top cover having a back and a side wall having at least two holes extending laterally therethrough; and lateral mounting members extending laterally from the at least two holes in the side wall of the top cover engaging at least portions of the at least two holes in the plurality of side walls of the flat-panel display.

2. In the flat-panel display described in claim 1, wherein the lateral mounting members extend through the at least two holes in opposed portions of the side wall of the top cover.

3. In the flat-panel display described in claim 1, wherein the lateral mounting members comprise bolts that engage bosses of the flat-panel display.

4. In the flat-panel display described in claim 1, wherein the top cover comprises a plastic back, pivotal couplings connecting the top cover to a base unit, and at least one metal bracket that extends from the pivotal couplings, the lateral mounting members engaging the at least one metal bracket and the plastic back.

5. In the flat-panel display described in claim 4, wherein the lateral mounting members comprise bolts that pass through the at least one bracket and the plastic back to engage bosses of the flat-panel display.

6. In the flat-panel display described in claim 4, wherein the plastic back does not substantially contribute to the rigidity of the top cover.

7. In the flat-panel display described in claim 1, wherein the flat-panel display comprises:

the lateral mounting members comprising bolts that engage bosses of the display back of the flat-panel display, behind the rim.

* * * * *

(12) EX PARTE REEXAMINATION CERTIFICATE (6451st)
United States Patent
Bovio et al.

(10) Number: US 6,838,810 C1
(45) Certificate Issued: Sep. 23, 2008

(54) FLAT-PANEL DISPLAY MOUNTING SYSTEM FOR PORTABLE COMPUTER

(75) Inventors: Michele Bovio, Boston, MA (US); Robert C. Frame, Westboro, MA (US)

(73) Assignee: Chunghwa Picture Tubes, Ltd., Padeh Taoyuan (TW)

Reexamination Request:
No. 90/008,494, Feb. 9, 2007

Reexamination Certificate for:
Patent No.: 6,838,810
Issued: Jan. 4, 2005
Appl. No.: 08/822,438
Filed: Mar. 21, 1997

(51) Int. Cl.
*H01J 29/70* (2006.01)
*H01J 19/42* (2006.01)
*G06F 1/16* (2006.01)

(52) U.S. Cl. .................. 313/422; 313/238; 361/681; 361/683

(58) Field of Classification Search .................. None
See application file for complete search history.

(56) References Cited

U.S. PATENT DOCUMENTS 5,379,182 A 1/1995 Fujimori et al. ............. 361/681

FOREIGN PATENT DOCUMENTS

JP 07-99394 4/1995

*Primary Examiner*—Beverly M. Flanagan

(57) ABSTRACT

A flat-panel display with fixtures in its sidewalls to enable support by lateral mounting members is disclosed. The advantage of this approach, in which the fixtures are essentially rotated around to the sides of the flat-panel display, is the reduction in the portion of the portable computer's top cover that is not the active display. In practice, this results in an increase in the size of the display that may be housed in the same-sized top cover. In order to accommodate the lateral mounting of the flat-panel display, metal brackets are used. These brackets extend from the base unit hinges and cradle the display. This adds torsional rigidity, but also removes the requirement that the back must be structural. Further reductions in the inactive portions of the top cover may be achieved by extending the ends of the display's fluorescent back-light beyond or through the metal rim that surrounds the display.

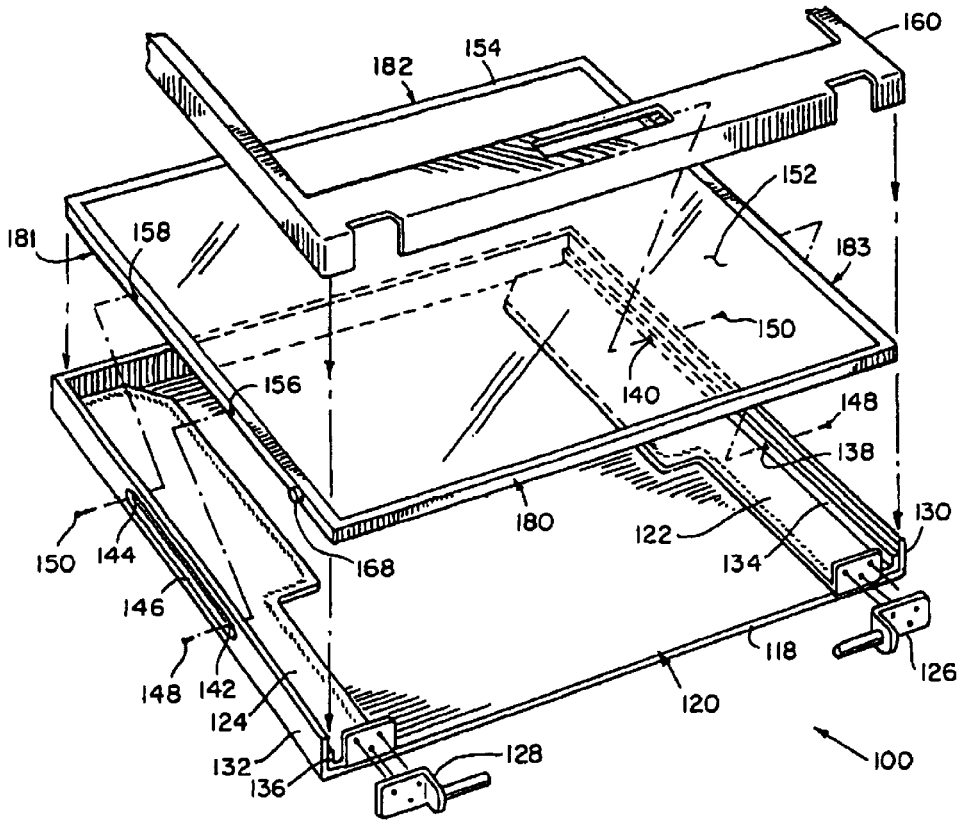

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–6 and 7 are determined to be patentable as amended.

New claim 8 is added and determined to be patentable.

1. [In a] *A* flat-panel display [having a back, a display area, and a light, a mounting system mounting the flat-panel display in a folding top cover of a portable computer, the mounting system] comprising:

[a flat-panel display comprising a display panel, a display rim extending around a perimeter of the display panel, and a display back, the flat-panel display having a plurality of side walls including at least two holes formed laterally therein for mounting the flat-panel display in the top cover of a portable computer, the top cover having a back and a side wall having at least two holes extending laterally therethrough; and]

*a display panel having a display area;*

*a display rim extending around a perimeter of the display panel;*

*a display back on the bottom of the display panel, wherein at least two first holes are laterally through the display rim and extending into the display back;*

*a top cover comprising a back, at least two side walls connecting to the back and having at least two second holes extending laterally therethrough, and a bezel engaged with the at least two side walls, wherein the display panel, the display rim and the display back are housed in the top cover, the display back is adjacent to the back of the top cover, the at least two second holes in the side walls of the top cover are aligned with the at least two first holes formed laterally through the display rim and extending into the display back, and the bezel covers the display rim and exposes the display area of the display panel; and* lateral mounting members extending laterally from the at least two *second* holes in the side [wall] *walls* of the top cover engaging at least portions of the at least two *first* holes [in the plurality of side walls of the flat-panel display] *formed laterally through the display rim and extending into the display back.*

2. [In the] *The* flat-panel display described in claim 1, wherein the lateral mounting members extend through the at least two *second* holes in opposed portions of the side wall of the top cover.

3. [In the] *The* flat-panel display described in claim 1, wherein the lateral mounting members comprise bolts that engage bosses of the [flat-panel display] *display rim and the display back*.

4. [In the] *The* flat-panel display described in claim 1, [wherein the top cover comprises a plastic back, pivotal couplings connecting the top cover to a base unit, and] *further comprising* at least one metal bracket [that extends from the pivotal couplings, the lateral mounting members engaging the at least one metal bracket and the plastic back] *located on the back of the top cover and against the side wall of the top cover.*

5. [In the] *The* flat-panel display described in claim 4, wherein the lateral mounting members comprise bolts that pass through the at least one bracket [and the plastic back to engage bosses of the flat-panel display].

6. [In the] *The* flat-panel display described in claim 4, wherein the [plastic] back *of the top cover* does not substantially contribute to the rigidity of the top cover.

7. [In the] *The* flat-panel display described in claim 1, wherein [the flat-panel display comprises:] the lateral mounting members [comprising] *comprises* bolts that engage bosses of the display back [of the flat-panel display], behind the *display* rim.

8. *The flat-panel display described in claim 4, wherein the at least one bracket is L shaped, and the shorter leg of the L shaped bracket extends orthogonally away from the back of the top cover and abuts the side walls of the top cover.*

\* \* \* \* \*